United States Patent
Elija et al.

(10) Patent No.: US 10,821,931 B2
(45) Date of Patent: Nov. 3, 2020

(54) KNEE AIRBAG MODULE

(71) Applicant: TRW AUTOMOTIVE GMBH, Alfdorf (DE)

(72) Inventors: Daniel Elija, Schwäbisch Gmümd (DE); Werner Freisler, Heubach (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 78 days.

(21) Appl. No.: 16/073,898

(22) PCT Filed: Feb. 3, 2017

(86) PCT No.: PCT/EP2017/052341
§ 371 (c)(1),
(2) Date: Jul. 30, 2018

(87) PCT Pub. No.: WO2017/137316
PCT Pub. Date: Aug. 17, 2017

(65) Prior Publication Data
US 2019/0039555 A1    Feb. 7, 2019

(30) Foreign Application Priority Data
Feb. 9, 2016   (DE) .................. 10 2016 001 455

(51) Int. Cl.
*B60R 21/206*    (2011.01)
*B60R 21/233*    (2006.01)
(Continued)

(52) U.S. Cl.
CPC .......... *B60R 21/233* (2013.01); *B60R 21/206* (2013.01); *B60R 2021/23169* (2013.01);
(Continued)

(58) Field of Classification Search
CPC ................ B60R 21/206; B60R 21/233; B60R 2021/23169; B60R 2021/23308; B60R 2021/23324; B60R 2021/23382
See application file for complete search history.

(56) References Cited

U.S. PATENT DOCUMENTS 7,232,142 B2   6/2007  Kudo
7,712,771 B2 *  5/2010  Freisler ................. B60R 21/206
                                                          280/730.1
(Continued)

FOREIGN PATENT DOCUMENTS

DE    19946477    3/2001
DE    102006051218    11/2007

*Primary Examiner* — Ruth Ilan
(74) *Attorney, Agent, or Firm* — Tarolli, Sundheim, Covell & Tummino LLP

(57) ABSTRACT

A knee airbag module of a vehicle occupant restraint system comprises an outer housing (14) in which an airbag (20) folded into an airbag package prior to its deployment as well as an inflator (16) generating filling gas for filling the airbag (20) are accommodated. In the outer housing (14) an exit opening (22) is formed through which the airbag (20) leaves the outer housing (14) during deployment. The airbag (20) is subdivided into plural chambers (28a-28f) arranged in series and being in fluid communication. The chamber closest to the inflator (28a) is separated from an adjacent chamber (28b) by a wall (32) which in the inflated airbag (20) extends substantially in the area of the exit opening (22) along the exit opening (22).

13 Claims, 3 Drawing Sheets

(51) Int. Cl.
*B60R 21/2338* (2011.01)
*B60R 21/231* (2011.01)
(52) U.S. Cl.
CPC ............... *B60R 2021/23308* (2013.01); *B60R 2021/23324* (2013.01); *B60R 2021/23382* (2013.01)

(56) References Cited

U.S. PATENT DOCUMENTS

| | | | | |
|---|---|---|---|---|
| 8,393,638 | B2* | 3/2013 | Gottschalk | B60R 21/206 280/730.1 |
| 8,505,969 | B2* | 8/2013 | Mendez | B60R 21/206 280/729 |
| 8,770,617 | B2* | 7/2014 | Abele | B60R 21/2338 280/730.1 |
| 8,998,249 | B2* | 4/2015 | Tanaka | B60R 21/206 280/730.1 |
| 10,086,788 | B2* | 10/2018 | Ando | B60R 21/206 |
| 2002/0171232 | A1 | 11/2002 | Abe | |
| 2012/0007345 | A1* | 1/2012 | Lee | B60R 21/206 280/728.2 |
| 2012/0205898 | A1* | 8/2012 | Picard | B60R 21/2338 280/730.1 |

* cited by examiner

KNEE AIRBAG MODULE

RELATED APPLICATIONS

This application corresponds to PCT/EP2017/052341, filed Feb. 3, 2017, which claims the benefit of German Application No. 10 2016 001 455.5, filed Feb. 9, 2016, the subject matter of which are incorporated herein by reference in their entirety.

BACKGROUND OF THE INVENTION

The invention relates to a knee airbag module of a vehicle occupant restraint system.

Knee airbag modules serve for the protection of the knee and shin region of a vehicle occupant and are arranged in a lower portion of an instrument panel or in the floor room adjacent to the instrument panel. The airbag of the knee airbag module is concealed behind the instrument panel or behind a floor room cover until deployment thereof. Upon activation of the knee airbag module, the airbag moves into the vehicle interior and deploys along the instrument panel in the direction of the vehicle occupant.

In so-called "low-mounted" modules, the knee airbag module is attached to the lower side of the instrument panel above the floor room. Upon deployment the airbag has to be moved out of the housing at first downwards in order to subsequently deploy upwards in a movement directed toward the occupant. This arrangement and deployment sequence distinguishes said "low-mounted" modules from the so-called "mid-mounted" modules which are arranged in the central area of the instrument panel and have an opening directed toward the occupant through which the airbag exits substantially in the horizontal direction in order to deploy in front of the shins or knees of the occupant.

SUMMARY OF THE INVENTION

It is the object of the invention to improve the exiting and deployment behavior of the airbag upon activation of the "low-mounted" knee airbag module.

This object is achieved by a knee airbag module of a vehicle occupant restraint system comprising an outer housing in which an airbag folded into an airbag package before its deployment as well as an inflator generating filling gas for filling the airbag are accommodated. In the outer housing an exit opening directed downwards in the mounting position is configured through which the airbag leaves the outer housing during deployment. The airbag is subdivided into plural chambers arranged in series and being in fluid communication, wherein the chamber closest to the inflator is separated from an adjacent chamber by a wall which in the inflated airbag extends substantially in the area of the exit opening and along the exit opening. The chamber closest to the inflator is arranged above the adjacent chamber in the mounting position.

The chamber closest to the inflator is filled already directly after activation of the knee airbag module, with the inflow of the filling gas and the filling of the chamber closest to the inflator advantageously forming the first inflating step after activation of the knee airbag module. The pressure caused by the increase in volume on the one hand may release the exit opening in that a flap covering the latter prior to activation of the knee airbag module is opened downwards and in the direction of the vehicle interior. On the other hand, when filling the chamber closest to the inflator, the remaining still folded airbag package may be displaced as a compact unit from the outer housing through the exit opening into the vehicle interior in front of the instrument panel or the floor room cover. The chamber closest to the inflator in this way can be advantageously used to move the remaining folded airbag package from the outer housing into the vehicle interior and to position the same at a point below the outer housing favorable for further deployment.

The chamber closest to the inflator in the filled state ends up in the area of the exit opening and preferably in the plane of the exit opening so that the remaining airbag package is placed exactly below the exit opening, before the remaining chambers of the airbag will deploy along the instrument panel. In this way, the airbag is safely moved around the edge of the exit opening without any inadvertent force acting on the edge of the instrument panel.

In order to achieve this objective, the chamber closest to the inflator may be arranged inside the outer housing so that it fills at least partially and generates a force directed out of the outer housing acting on the remaining airbag package. The chamber closest to the inflator may be located, for example, between the remaining airbag package and the rear wall of the outer housing so as to exert a defined force upon the remaining airbag package during filling.

In so doing, the chamber closest to the inflator is arranged in the folded airbag package so that after activation of the inflator in a first activating step at first the chamber closest to the inflator will fill, while the remaining airbag package still remains substantially in the folded state.

The force generated by the filling gas and the increase in volume of the chamber closest to the inflator is preferably directed substantially perpendicularly to the plane of the exit opening. Said direction may coincide with the vertical, when the knee airbag module is arranged in the vehicle at the lower end of the instrument panel and the plane of the exit opening is located substantially horizontally. In this activating step, the airbag package then is moved substantially perpendicularly to the exit opening without any cross components occurring already along the instrument panel.

The wall delimiting the chamber closest to the inflator is configured so that it permits fluid communication between the chamber closest to the inflator and the adjacent chamber, with the entire gas flow being intended to take place exclusively from the inflator into the chamber closest to the inflator and from there into the directly adjacent chamber. The initially filled volume is limited by the wall of the chamber closest to the inflator and/or by the type of folding of the remaining airbag package.

Preferably, the airbag package is folded and the chamber closest to the inflator is arranged in such manner that the filling gas generated by the inflator at first flows directly and completely into the chamber closest to the inflator. The direct inflow may be backed by the fact that the flow path inside the chamber closest to the inflator is not crossed by a fold of the airbag, a partition or a tether inside the airbag.

The shape and the volume of the chamber closest to the inflator can be designed so that the chamber closest to the inflator in the inflated state fills the compartment inside the outer housing substantially completely. It has turned out that in this way a force directed perpendicularly to the exit opening can be generated onto the entire surface of the remaining airbag package in a properly reproducible manner.

In order to place the folded airbag package directly in front of the exit opening in the vehicle interior, it is of advantage when the wall separating the chamber closest to the inflator and the remaining airbag package from each other in the inflated state of the airbag is located in the plane or substantially in parallel to the plane of the exit opening.

In a first preferred embodiment, the wall is formed by a constriction or a partition connected to at least one flow orifice between the chamber closest to the inflator and an adjacent second chamber. The constriction may be produced, for example, by the shape of the pre-cut parts of the chamber closest to the inflator and of the directly adjacent second chamber. It is furthermore a simple measure for producing the wall to insert a partition including flow orifices between the chamber closest to the inflator and the adjacent chamber.

In a second preferred embodiment, the wall is formed by at least one tether extending inside the airbag which connects two opposite outer wall portions of the airbag and limits a maximum distance between the outer wall portions.

The tether preferably extends in the plane of the exit opening so as to achieve, in the initial activation phase, a defined positioning of the remaining airbag package directly in front of the exit opening.

In each embodiment, the wall may be configured in such manner that it constitutes a resistance to the inflowing filling gas so that initially the chamber closest to the inflator is filled and the remaining airbag package still remains substantially folded. It is also imaginable, in the initial deployment phase, to supplement the wall by a fold of the airbag package which is disposed so that further inflow of the gas into the remaining chambers is not possible before the chamber closest to the inflator has deployed more or less completely. To this end, for example a portion of the outer wall of the airbag might be located above a flow orifice between the chamber closest to the inflator and the chamber adjacent thereto.

For example, the airbag includes at least three chambers arranged in series, wherein the chamber closest to the inflator abuts on a second chamber and the second chamber abuts on a third chamber in such manner that the airbag in total takes a curved shape in the inflated state. This allows the airbag to follow the curvature of the instrument panel and to place itself between the instrument panel and the knee-shin region of the vehicle occupant.

The chamber closest to the inflator, the second chamber and the third chamber preferably draw approximately an angle of 90°, with the second chamber being aligned with the interior of the outer housing. This configuration ensures that, after the remaining folded airbag package has been pushed through the chamber closest to the inflator in front of the exit opening, the airbag may deploy along the instrument panel without the latter constituting an obstacle to deployment.

In support of the curvature of the airbag along the instrument panel, for example the second chamber may be separated from the third chamber by a partition provided with at least one flow orifice, with the partition in the inflated state of the airbag extending at an angle of about 0° to 30° with the vertical.

Preferably, the chamber closest to the inflator in the inflated state of the airbag has a smaller volume than the adjacent second chamber, as the chamber closest to the inflator serves merely for sliding the remaining airbag out of the outer housing in the initial activation phase of the knee airbag module, while the adjacent second chamber may also develop a restraining effect.

BRIEF DESCRIPTION OF THE DRAWINGS

In the following, the invention shall be described in detail by way of two example embodiments with reference to the enclosed drawings, wherein.

DESCRIPTION

Figure 1:
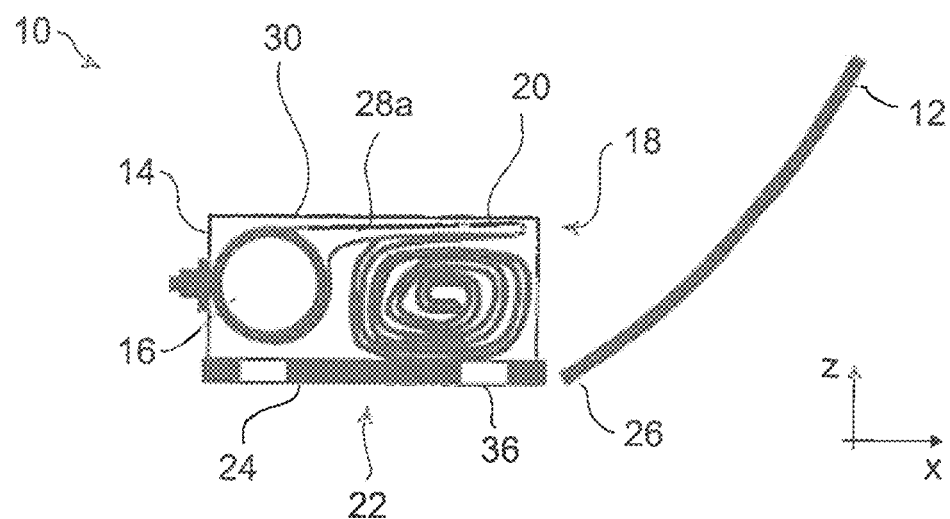
FIG. 1 shows a schematic sectional view of a knee airbag module according to the invention in accordance with a first embodiment prior to activation.

FIGS. 1 to 4 illustrate a knee airbag module 10 of a vehicle occupant restraint system not shown in detail according to a first embodiment.

The knee airbag module 10 is disposed in an opening of an instrument panel 12 or adjacent to a lower end of the instrument panel 12. The knee airbag module 10 includes an outer housing 14 in which an inflator 16 as well as an airbag 20 folded into an airbag package 18 prior to deployment are accommodated. An exit opening 22 of the outer housing 14 for the airbag 20 is closed by a cover 24 prior to activation of the knee airbag module 10. The cover 24 extends in extension of the instrument panel 12 and in this case abuts on an edge 26 of the instrument panel 12 which may form either a lower end of the instrument panel 12 or an upper end of a recess in the instrument panel 12.

Figure 4:
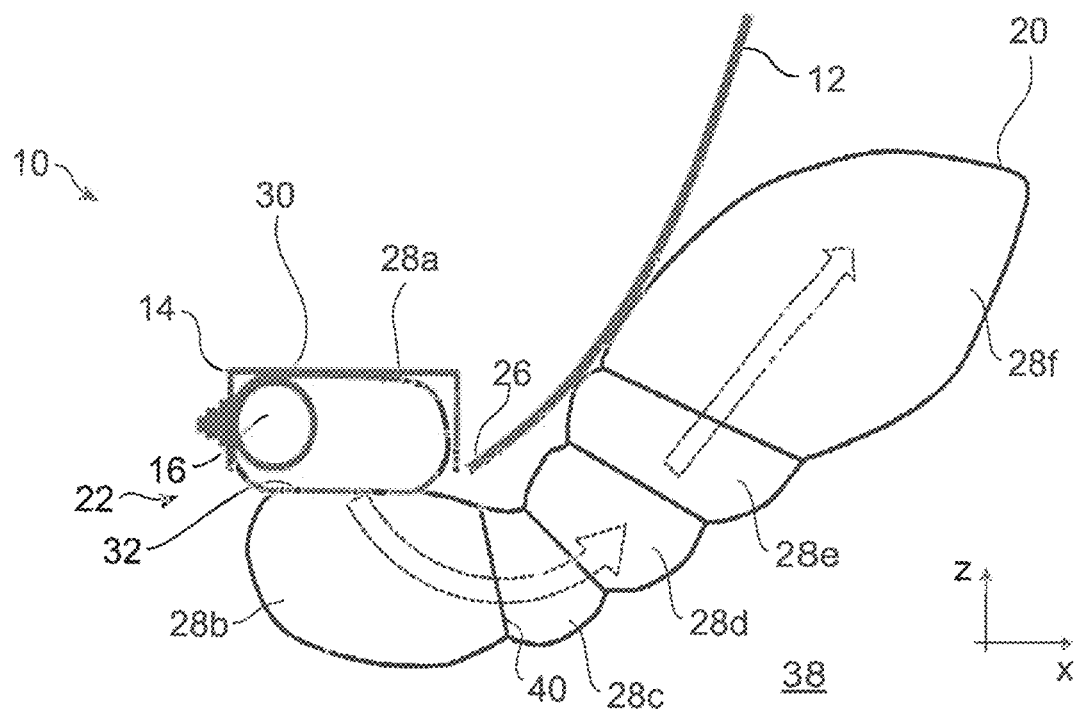
FIG. 4 shows the knee airbag module from FIG. 1, with the airbag being fully deployed.

The airbag 20 is subdivided into plural chambers 28a to 28f arranged in series (cf. FIG. 4). The chamber closest to the inflator 28a, also referred to as first chamber 28a, abuts directly on the inflator 16 and as the first chamber of the airbag 20 receives the filling gas flowing out of the inflator 16.

In the folded airbag package 18 the chamber closest to the inflator 28a is disposed so that the filling gas can flow from the inflator 16 directly into said chamber and forthwith results in an increase in volume of the chamber 28a. In this example, the chamber 28a is not folded in itself and is placed directly between a rear side 30 of the outer housing 14 and the remaining airbag package 18.

FIG. 1 shows the state of the knee airbag module 10 prior to activation. The cover 24 closes the exit opening 22 and the airbag package 18 is received in a completely folded state in the outer housing 14.

Figure 2:
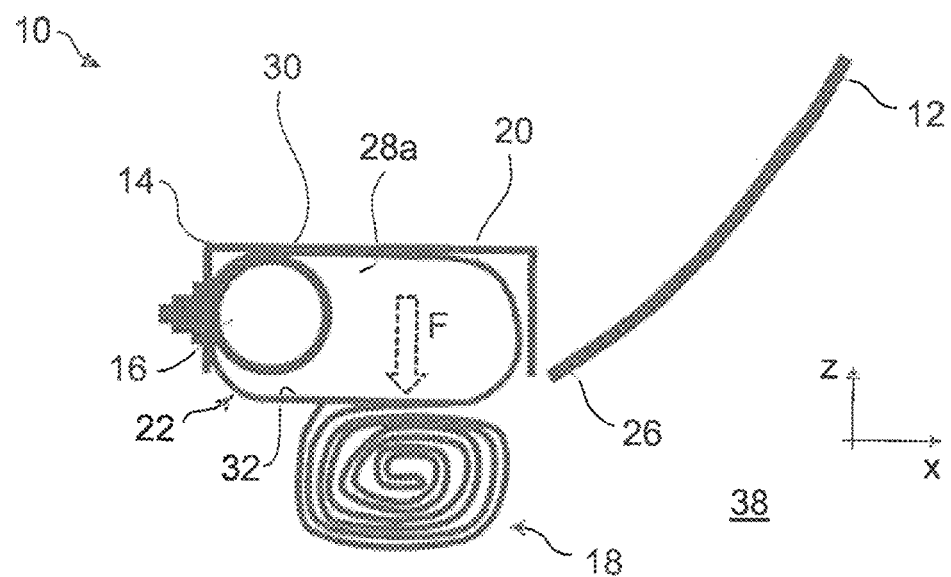
FIG. 2 shows the knee airbag module from FIG. 1 in a first activation step.

Upon activation of the knee airbag module 10 in a first activation step, as shown in FIG. 2, at first exclusively the chamber closest to the inflator 28a of the airbag 20 is filled. Within short time, in the example shown here said chamber takes its maximum volume which approximately corresponds to the dimensions of the interior of the outer housing 14.

Due to this increase in volume, a force F directed perpendicularly to the exit opening 22 and to the cover 24 is formed. The force F acts on the entire surface of the airbag package 18 extending in parallel to the exit opening 22 and presses the still folded airbag package 18 initially against the cover 24. The latter yields at predetermined weakened zones 36 so that the exit opening 22 is released. Subsequently, the force F caused by the inflating first chamber closest to the inflator 28a presses against the airbag package 18 and pushes the latter perpendicularly to the plane of the exit opening 22 into the vehicle interior 38. Now the airbag package 18 is located below the edge 26 of the instrument panel 12. This state is illustrated in FIG. 2.

The wall 32 separating the chamber closest to the inflator 28a from the adjacent second chamber 28b in this example is formed by a constriction 34 due to shape between the chamber 28a and the chamber 28b which constriction results from the configuration of the individual pre-cut parts of the airbag 20. The wall 32 might also be realized, for example, by a fabric part inserted in the airbag 20 including one or more flow orifices which separate the chambers 28a, 28b from each other.

When the chamber closest to the inflator 28a is completely inflated, the wall 32 in this example is located in the plane of the exit opening and extends along the exit opening 22.

In this example, the wall 32 constitutes a flow resistance resulting in the complete inflation of the chamber 28a before the remainder of the airbag package 18 starts to substantially deploy to the gas flow from the inflator 16.

It is also imaginable that in the first activation step flow orifices in the wall 32 are closed by the remaining airbag package 18 so that substantially no gas can yet flow into the remaining airbag 20 outside the chamber closest to the inflator 28a.

Figure 3:
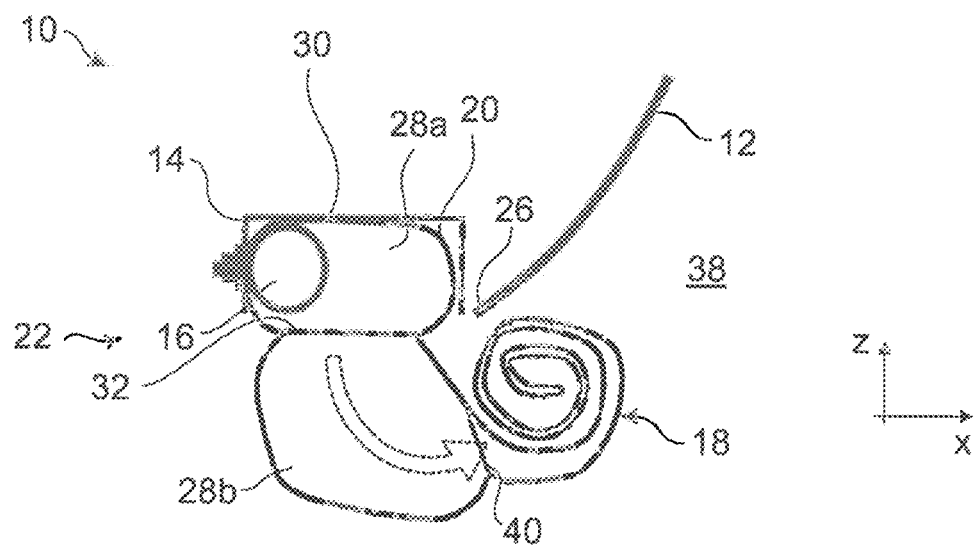
FIG. 3 shows the knee airbag module from FIG. 1 in a second activation step.

In a second activation step shown in FIG. 3, now the filling gas generated by the inflator 16 flows through the chamber closest to the inflator 28a also into the second chamber 28a and deploys the latter. From there, the gas continues to flow into the remaining chambers 28c to 28f so that the airbag 20 will deploy along the instrument panel 12 and inflate into its final shape. This is shown in FIG. 4.

The volume of the inflated chamber closest to the inflator 28a is significantly smaller than that of the adjacent second chamber 28b.

The second chamber 28b is arranged here in the inflated state directly below the chamber closest to the inflator 28a and is aligned with the interior of the outer housing 14.

In total, the airbag 20 in the inflated state describes a curved shape. Inter alia, this is due to the first three chambers 28a, 28b, 28c arranged approximately at an angle of 90°.

All chambers 28a to 28f are linearly interconnected in terms of flow, wherein the gas supplied by the inflator 16 can flow only from one chamber into the next one directly adjacent thereto and all of the gas at first flows into the chamber closest to the inflator 28a. This is illustrated by arrows in FIG. 4.

The deployment of the airbag 20 along the instrument panel 12 into its final position in which it protects the knee/shin region of the vehicle occupant therefore takes place only after the airbag package 18 including the still folded chambers 28b to 28f that are in charge of the protection of the vehicle occupant has already left the outer housing 14. This initial positioning of the airbag package 18 which is still largely folded within the vehicle interior 38 in this case is exclusively effectuated by the inflating chamber closest to the inflator 28a.

The partition 40 between the second chamber 28b and the third chamber 28c in this case is located in the completely inflated airbag 20 at an angle of about 0° to 30° with the vertical.

The individual chambers 28a to 28f may be delimited from each other, just as the chamber closest to the inflator 28a from the adjacent second chamber 28b, by a constriction or a partition having flow orifices but also by tethers. This is left to the discretion of those skilled in the art.

Figure 5:
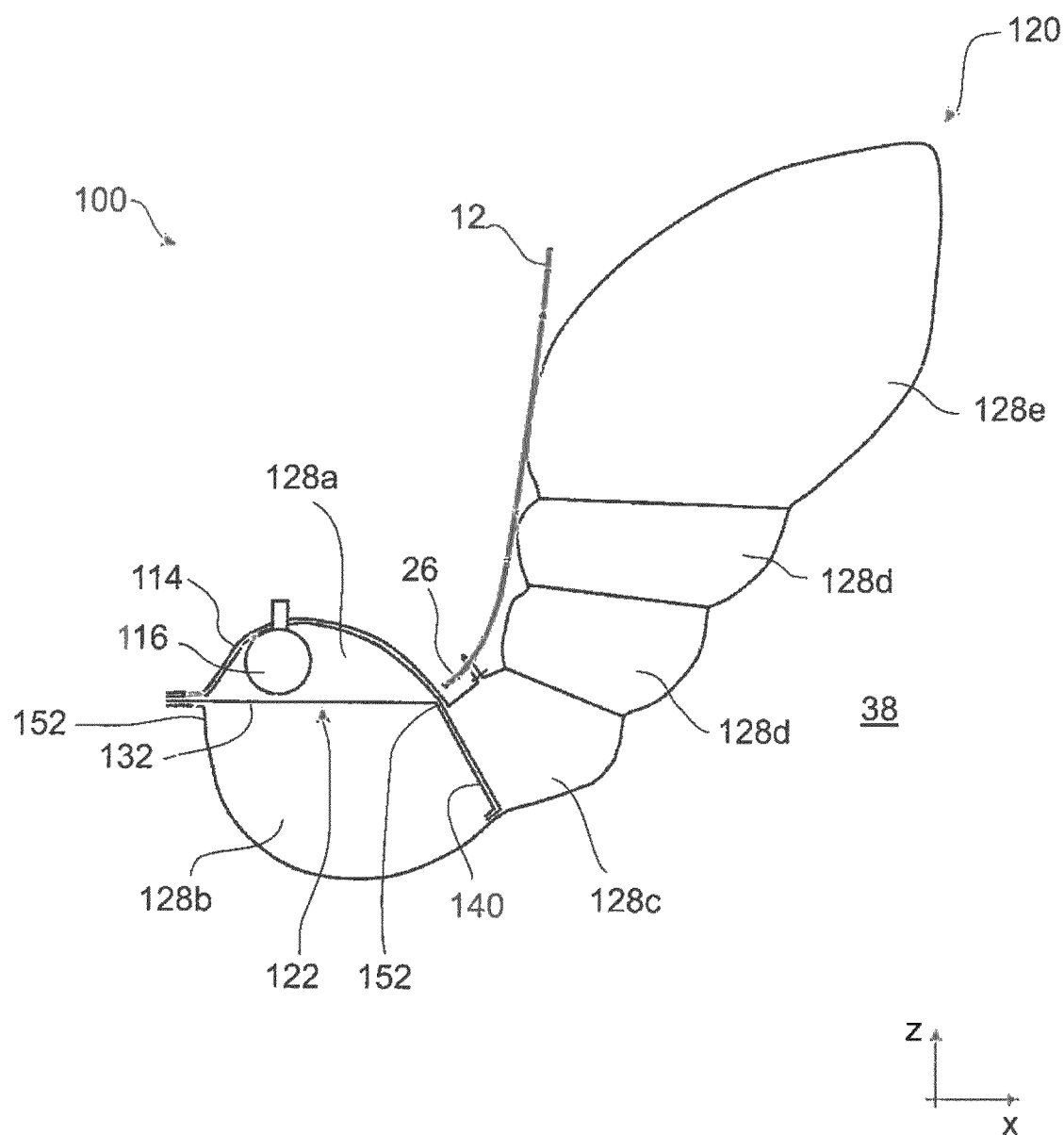
FIG. 5 shows a schematic sectional view of a knee airbag module according to the invention in accordance with a second embodiment with the knee airbag being in the fully deployed state.

FIG. 5 illustrates a knee airbag module 100 according to a second embodiment.

The airbag 120 is shown here in its completely inflated form only. However, it is accommodated, just as in the first embodiment, prior to activation of the knee airbag module 100 while being folded into an airbag package inside the outer housing 114 together with an inflator 116.

The wall 132 between the first chamber closest to the inflator 128a and the adjacent chamber 128b in this case is formed, in contrast to the first embodiment, however, by one or more tethers which are arranged in the plane of the exit opening 122 of the outer housing 114.

The at least one tether forming the wall 132 connects two opposite outer wall portions 150, 152 of the airbag 120 and limits the distance thereof to the width of the exit opening 122.

Moreover, the wall 132 offers particular flow resistance which ensures the first chamber 128a to be inflated first and pushing the still folded remaining airbag package forward by a force acting perpendicularly to the exit opening 122 through the exit opening 122 into the vehicle interior 38. There the remaining airbag 120 deploys into the curved inflated shape shown in FIG. 5 in which it is located between the instrument panel 12 and the knee/shin region of the vehicle occupant (not shown). The subdivision constituted by the wall 132 level with the exit opening 122 helps to taper the area of the airbag 120 close to the inflator in the plane of the exit opening 122, thus additionally generating a force directed perpendicularly to the exit opening 122.

In this example, the chambers 128a, 128b may be formed by joint pre-cut parts of the outer wall. The subdivision into the individual chambers 128a, 128b may be made completely by the tether or tethers forming the wall 132.

The wall 132 is gas-permeable also in this embodiment, however, so that the filling gas provided by the inflator 116 can flow in series through all of the chambers 128a to 128f. The tether forming the wall 132 may include one or more flow orifices, for example, but may as well be disposed in the interior of the airbag 120 so that the gas may flow past the sides of the tether into the adjacent chamber 128b.

In this example embodiment, too, the partition 140 is inclined between the second chamber 128b and the third chamber 128c by approximately 0° to 30° relative to the vertical.

Otherwise, the substantial features of the knee airbag module 100 are in conformity with those of the knee airbag module 10 of the first embodiment.

In the shown example, the tether forming the wall 132 is formed integrally with a portion of the partition 140 between the second chamber 128b and the third chamber 128c. At the transition from the wall 132 to the partition 140 the tether is stitched to the airbag wall.

The features of the individual example embodiments may be combined with or exchanged for each other at the discretion of those skilled in the art, as a matter of course.

The invention claimed is:

1. A knee airbag module of a vehicle occupant restraint system, comprising an outer housing (14; 114) in which an airbag (20; 120) folded into an airbag package (18) prior to its deployment and an inflator (16; 116) for generating filling gas for filling the airbag (20; 120) are accommodated, wherein an exit opening (22; 122) oriented downwards in the mounting position through which during deployment the airbag (20; 120) leaves the outer housing (14; 114) is formed in the outer housing (14; 114), wherein the airbag (20; 120) is subdivided into plural chambers (28a-28f; 128a-128f) arranged in series and being in flow communication, a chamber closest to the inflator (28a; 128a) being separated from an adjacent chamber (28b; 128b) by a wall (32; 132)

which in the inflated airbag (20; 120) substantially extends in the area of the exit opening (22; 122) along the exit opening (22; 122), and wherein upon activation of the inflator (28*a*; 128*a*), the chamber closest to the inflator (28*a*; 128*a*) deploys in the area of the exit opening (22; 122) so that the remaining portions of the airbag package (18) are initially positioned vertically downward from the exit opening (22; 122) and deploy vertically upward therefrom toward a vehicle occupant.

2. The knee airbag module according to claim 1, wherein the chamber closest to the inflator (28*a*; 128*a*) is arranged inside the outer housing (14; 114) so that it fills at least partially and generates a force (F) directed out of the outer housing (14; 114) toward the remaining airbag package (18).

3. The knee airbag module according to claim 1, wherein the chamber closest to the inflator (28*a*; 128*a*) is arranged in the folded airbag package (18) such that upon activation of the inflator (16; 116) at first the chamber closest to the inflator (28*a*; 128*a*) will fill, while the remaining airbag package (18) still remains substantially in the folded state.

4. The knee airbag module according to claim 1, wherein the airbag package (18) is folded and the chamber closest to the inflator (28*a*; 128*a*) is arranged in such manner that the filling gas generated by the inflator (16; 116) at first flows directly and completely into the chamber closest to the inflator (28*a*; 128*a*).

5. The knee airbag module according to claim 1, wherein in the inflated state the chamber closest to the inflator (28*a*; 128*a*) substantially completely fills the compartment inside the outer housing (14; 114).

6. The knee airbag module according to claim 1, wherein the wall (32; 132) separating the chamber closest to the inflator (28*a*; 128*a*) from the remaining airbag package (18) in the inflated state of the airbag (20; 120) is located in the plane or substantially in parallel to the plane of the exit opening (22; 122).

7. The knee airbag module according to claim 1, wherein the wall (32) is formed by a constriction (34) or a partition between the chamber closest to the inflator (28*a*) and an adjacent second chamber (28*b*) which is connected to at least one flow orifice.

8. The knee airbag module according to claim 1, wherein the wall (132) is formed by at least one tether extending inside the airbag (120) which connects two opposite outer wall portions (150, 152) of the airbag (120) and limits a maximum distance between the outer wall portions (150, 152).

9. The knee airbag module according to claim 1, wherein the airbag (20; 120) includes at least three chambers arranged in series (28*a*-28*f*; 128*a*-128*f*), wherein the chamber closest to the inflator (28*a*; 128*a*) abuts on a second chamber (28*b*; 128*b*) and the second chamber (28*b*; 128*b*) abuts on a third chamber (28*c*; 128*c*) so that the airbag (20; 120) in total takes a curved shape in the inflated state.

10. The knee airbag module according to claim 9, wherein the chamber closest to the inflator (28*a*; 128*a*), the second chamber (28*b*; 128*b*) and the third chamber (28*c*; 128*c*) describe approximately an angle of 90°, with the second chamber (28*b*; 128*b*) being aligned with the interior of the outer housing (14; 114).

11. The knee airbag module according to claim 9, wherein the second chamber (28*b*; 128*b*) is separated from the third chamber (28*c*; 128*c*) by a partition (40; 140) which is provided with at least one flow orifice and, in the inflated state of the airbag (20; 120), extends at an angle of 0 to 30° with the vertical.

12. The knee airbag module according to claim 1, wherein the chamber closest to the inflator (28*a*; 128*a*) in the inflated state of the airbag (20; 120) has a smaller volume than the adjacent second chamber (28*b*; 128*b*).

13. A knee airbag module of a vehicle occupant restraint system, comprising an outer housing (14; 114) in which an airbag (20; 120) folded into an airbag package (18) prior to its deployment and an inflator (16; 116) for generating filling gas for filling the airbag (20; 120) are accommodated, wherein an exit opening (22; 122) oriented downwards in the mounting position through which during deployment the airbag (20; 120) leaves the outer housing (14; 114) is formed in the outer housing (14; 114), wherein the airbag (20; 120) is subdivided into at least three chambers (28*a*-28*f*; 128*a*-128*f*) arranged in series and being in flow communication, a chamber closest to the inflator (28*a*; 128*a*) abutting on a second chamber (28*b*; 128*b*) and being separated from the second chamber (28*b*; 128*b*) by a wall (32; 132), the wall (32; 132) substantially extending in the area of the exit opening (22; 122) along the exit opening (22; 122) when the airbag (20; 120) is in the inflated state, and wherein the second chamber (28*b*; 128*b*) abuts on a third chamber (28*c*; 128*c*) and is separated from the third chamber (28*c*; 128*c*) by a partition (40; 140), the partition (40; 140) having at least one flow orifice, the partition (40; 140) extending at an angle of 0 to 30° relative to the vertical when the airbag (20; 120) is in the inflated state.

* * * * *